United States Patent
Abdelfatah

(10) Patent No.: US 11,685,434 B2
(45) Date of Patent: Jun. 27, 2023

(54) METHOD FOR REAR STEERING CONTROL OF A VEHICLE

(71) Applicant: HYUNDAI MOBIS CO., LTD., Seoul (KR)

(72) Inventor: Mahmoud Abdelfatah, Plymouth, MI (US)

(73) Assignee: Hyundai Mobis Co., Ltd., Seoul (KR)

( * ) Notice: Subject to any disclaimer, the term of this patent is extended or adjusted under 35 U.S.C. 154(b) by 137 days.

(21) Appl. No.: 17/145,762

(22) Filed: Jan. 11, 2021

(65) Prior Publication Data

US 2022/0219754 A1  Jul. 14, 2022

(51) Int. Cl.
B62D 7/15 (2006.01)
B62D 6/00 (2006.01)

(52) U.S. Cl.
CPC ............ B62D 7/159 (2013.01); B62D 6/001 (2013.01); B62D 6/002 (2013.01)

(58) Field of Classification Search
CPC ..................................................... B62D 6/002
See application file for complete search history.

(56) References Cited

U.S. PATENT DOCUMENTS

| | | | |
|---|---|---|---|
| 4,720,790 A | 1/1988 | Miki et al. | |
| 5,224,042 A | 6/1993 | Morrison et al. | |
| 5,274,555 A | 12/1993 | Fukunaga et al. | |
| 5,386,365 A * | 1/1995 | Nagaoka | B62D 7/159 |
| | | | 701/44 |
| 5,615,117 A | 3/1997 | Serizawa | |
| 5,754,966 A | 5/1998 | Ichikawa et al. | |
| 6,546,323 B2 | 4/2003 | Deguchi et al. | |
| 6,623,089 B2 | 9/2003 | Amberkar | |
| 6,625,529 B2 | 9/2003 | Obata et al. | |
| 7,130,729 B2 | 10/2006 | Shin et al. | |
| 7,212,903 B2 | 5/2007 | Niino et al. | |
| 7,558,657 B2 | 7/2009 | Manken et al. | |

(Continued)

FOREIGN PATENT DOCUMENTS

| | | |
|---|---|---|
| CN | 202448976 | 9/2012 |
| DE | 102004046890 | 3/2006 |

(Continued)

OTHER PUBLICATIONS

Hiroki Sato, et al. "Development of Four Wheel Steering System Using Yaw Rate Feedback Control", SAE Technical Paper 911922, 9 pages, Sep. 16-19, 1991, https://doi.org/10.4271/911922.

(Continued)

*Primary Examiner* — Jeff A Burke
*Assistant Examiner* — Christopher A Buksa
(74) *Attorney, Agent, or Firm* — H.C. Park & Associates, PLC

(57) ABSTRACT

A method of controlling rear wheel steering in a vehicle including determining a stability state of the vehicle from a plurality of vehicle sensor inputs, determining a target vehicle performance based on the stability state of the vehicle, and determining a target rear angle of rear vehicle wheels based on a difference between a target vehicle characteristic and a model vehicle characteristic, wherein the target vehicle performance promotes agility and stability to a target model at different times based on the stability state of the vehicle.

11 Claims, 4 Drawing Sheets

(56) References Cited

U.S. PATENT DOCUMENTS

| | | | |
|---|---|---|---|
| 7,912,606 B2 | 3/2011 | Auguet | |
| 8,046,132 B2 | 10/2011 | Auguet et al. | |
| 8,165,755 B2 | 4/2012 | Garcia et al. | |
| 8,364,350 B2 | 1/2013 | Yanagi et al. | |
| 8,554,416 B2 | 10/2013 | Horiuchi et al. | |
| 8,594,888 B2 | 11/2013 | Fujita et al. | |
| 8,670,909 B2 | 3/2014 | Perkins et al. | |
| 10,427,544 B2* | 10/2019 | Moriya | B60L 15/20 |
| 2007/0221425 A1* | 9/2007 | Meissner | B60K 23/04 |
| | | | 180/233 |

FOREIGN PATENT DOCUMENTS

| | | | |
|---|---|---|---|
| EP | 2085293 A1 * | 8/2009 | B62D 7/159 |
| FR | 2883828 | 5/2007 | |
| FR | 2887839 | 9/2007 | |
| JP | 06247330 | 9/1994 | |
| JP | 3179271 | 6/2001 | |
| JP | 2005-088665 | 4/2005 | |
| JP | 5144304 | 2/2013 | |
| JP | 5146540 | 2/2013 | |

OTHER PUBLICATIONS

Y.Lin., "Improving Vehicle Handling Performance by a Closed-Loop 4WS Driving Controller", SAE Technical Paper 921604, pp. 1-11, Aug. 10-13, 1992, https://doi.org/10.4271/921604.

Parviz E. Nikravesh, et al. "Optimal Four-Wheel Steering Strategy Using Nonlinear Analytical Vehicle Models", SAE Technical Paper 931915, pp. 1-8, Nov. 15-19, 1993, https://doi.org/10.4271/931915.

Toshinari Shiotsuka, et al., "Active Control of Drive Motion of Four Wheel Steering Car with Neural Network", SAE Technical Paper 940229, Feb. 28-Mar. 3, 1994, pagers 145-158, https://doi.org/10.4271/940229.

L.Gianone, et al., "Design of an active 4ws system with physical uncertainties", Control Engineering Practice. vol. 3, Issue 8, Aug. 1995, pp. 1075-1083, https://doi.org/10.1016/0967-0661(95)00099-G.

Kozo Fujita, et al., "Development of Active Rear Steer System Applying H∞-μ synthesis", SAE Technical Paper 981115, Feb. 23-26, 1998, pp. 1-8, https://doi.org/10.4271/981115.

Yingmin Jia, "Robust control with decoupling performance for steering and traction of 4WS vehicles under velocity-varying motion", IEEE Transactions on Control Systems Technology; vol. 8, Issue: 3, May 2000, pp. 554-569, https://doi.org/10.1109/87.845885.

Andrea Morgando, et al., "An Innovative Control Logic for a Four Wheel Steer Vehicle—Part 1: Analysis and Design", SAE Technical Paper 2005-01-1267, Apr. 11-14, 2005, 11 pages, https://doi.org/10.4271/2005-01-1267.

Tianjun Zhu, et al., "Research on Control Algorithm for DYC and Integrated Control with 4WS", International Conference on Computational Intelligence and Natural Computing (CINC) 2009, pp. 166-169, https://doi.org/10.1109/CINC.2009.91.

Zhiyun Zhang, et al., "Design of the Linear Quadratic Control Strategy and the Closed-Loop System for the Active Four-Wheel-Steering Vehicle", SAE Int. J. Passeng. Cars—Mech. Syst., vol. 8, Issue 1, pp. 354-363, May 2015, https://doi.org/10.4271/2015-01-9107.

* cited by examiner

METHOD FOR REAR STEERING CONTROL OF A VEHICLE

BACKGROUND

Field

Exemplary embodiments and implementations of the invention relate generally to a motor vehicle control system, and more particularly to a system to control rear wheel steering.

Objectives of electronic stability control systems include preventing vehicles from spinning (oversteer) or plowing out (understeer). Prevention of oversteer and understeer may be achieved by controlling the vehicle in response to both yaw rate and sideslip angle, which are values that impact lateral motion of a vehicle.

The above information disclosed in this Background section is only for understanding of the background of the inventive concepts, and, therefore, it may contain information that does not constitute prior art.

SUMMARY

The Summary section will track the Claims when finalized.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
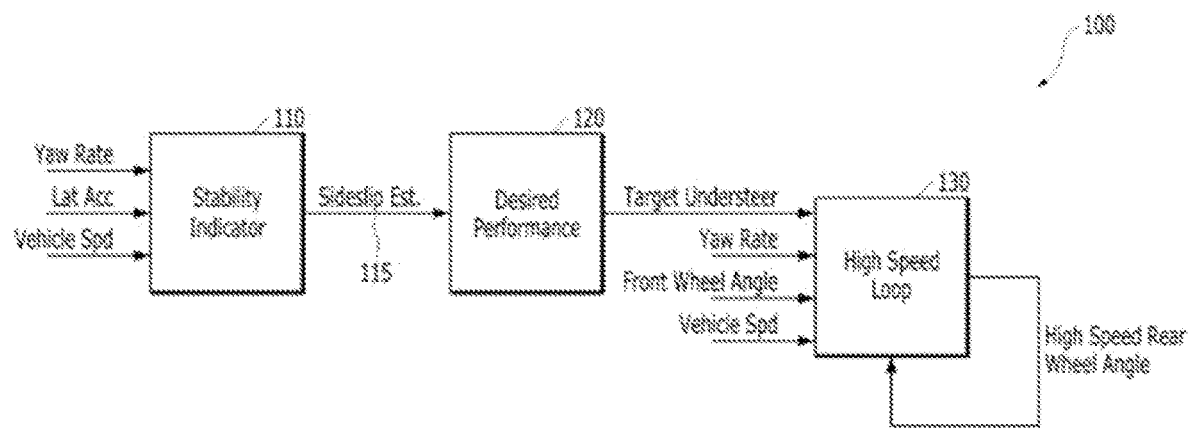
FIG. 1 illustrates a block diagram of the rear wheel steering control system in accordance with embodiments described herein.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The X-axis, the Y-axis, and the Z-axis are not limited to three axes of a rectangular coordinate system, and may be interpreted in a broader sense.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Many rear wheel steering (RWS) systems on the market today focus on speed and phase-based response in vehicles. In a phase-based system, at low speeds when front wheels are turned in a first direction, rear wheels are turned in an opposite direction. At high speeds rear wheels are turned in phase, in a same direction as the front wheels.

This type of control logic creates a tradeoff between "stability" and "agility" and creates scenarios where a vehicle has poorer performance in comparison to a traditional single steered axle. Even systems that use advanced methods such as yaw rate control still focus on minimizing side slip, i.e. "stability," at high speeds. These systems yield similar results to pure phase control.

Some systems define rear position as a ratio between front and rear wheels that is vehicle speed dependent. Similar to other systems at low speeds the rear wheels steer out of phase with the front. As speed builds, the ratio between the front and rear wheels will decrease to zero and eventually switch directions and make the rear wheels steer in phase with the front. A motivation behind this is to increase "stability" at high speeds. One issue with this approach at high speeds is the system chooses "stability" over "agility" all of the time, even when stability may not be the optimal performance. The rear wheels may have their own mechanism for separately controlling the rear wheels independently from the front wheels.

Systems described herein and many vehicle performance characteristics in the field prefer stability control systems that lean towards understeer versus oversteer. Aspects of understeer will be described herein, but principles of inventive concepts may also be used for vehicle systems that prefer a vehicle exhibit oversteer more than understeer.

In general use, there may be many yaw rate controllers in an automobile. Stability control is one example. If a driver makes a hard turn with a steering wheel that results in an undesired large yaw motion, the yaw rate controller will measure how much an automobile is yawing, how much the automobile is turning on the vertical axis. In some automobiles, a yaw rate controller, in this case, will start actuating the brakes in certain parts of the vehicle, to decrease the yaw motion to a desired value, but embodiments are not limited thereto. Embodiments described herein monitor the yaw rate of a vehicle and compare it to a desired yaw rate. If the target yaw rate is lower (i.e. "unstable" or "oversteer" then the system will actuate the brakes to resolve this issue. If the target yaw rate is higher (i.e. "understeer" then the system will actuate the brakes to resolve this issue. The system may also use aspects of the powertrain and drivetrain to control yaw rate.

In general, vehicle stability may be defined by numerous factors or inputs, and many inputs may contribute to vehicle characteristics. For example, many stability factors may work together to determine a moment of understeer or oversteer in terms of when vehicle tires reach a saturation point. At any point when a tire cannot perform as desired such as during a combination of lateral and longitudinal acceleration or deceleration, a tire may reach saturation. Thus, a combination of factors may contribute to a vehicle's stability.

Control logic for rear wheel steering described herein is able to distinguish between maneuvers real time and provide better tradeoff between agility and stability using vehicle sensor information and provide a system that is tunable to driver's tastes. This is achieved with a varying model reference feedback controller including a target understeer model, a vehicle model, a controller, and actuator dynamics. In the varying model reference feedback controller there may be three performance targets or "virtual vehicles" that a yaw rate target may be generated from: a "vehicle" target with the same yaw response of the vehicle with a single steered axle, a "stability" target that has a decreased yaw response from the vehicle with a single steered axle, and an "agility" target that has an increased yaw response from the vehicle with a single steered axle.

The controller decides which of these virtual vehicles (or somewhere in-between) to target based on an estimated vehicle stability indicator, such as sideslip. Once a target is set, a proportional-integral-derivative (PID) controller, for example, may be used to produce a target rear wheel angle based on a yaw rate error, or other vehicle characteristic. The final angle is then fed to a position controller to direct the vehicle's rear wheel angle.

FIG. 1 illustrates a block diagram of the rear wheel steering system 100 in accordance with embodiments described herein. As illustrated in FIG. 1, the system 100 includes three processes that may be used to generate a target rear angle. A stability indicator 110 may be used as an indicator of a vehicle's state. A vehicle's state may be characterized by the vehicle's stability. The state may be calculated based on vehicle sensor data gathered from a controller area network (CAN). Sensor data may include yaw rate, lateral acceleration, vehicle speed, and other inputs. An objective of the stability indicator 110 is to determine stability. One way to accomplish this is to distinguish between small and large side slip angles, which can be representative of how close to the limit a vehicle is during a maneuver. The information derived from the stability indicator 110 may be used by the system 100 to determine whether characteristics such as stability, agility, or some value in between should be promoted in the vehicle. The sensor inputs are used to determine the target understeer value.

The stability indicator 110 may be paired with or dictate the inputs to the system 100. In one configuration, the system 100 may use a sideslip estimate 115 to determine the vehicle's stability, but embodiments are not limited thereto. Other indicators of stability output by the stability indicator 110 include a phase plane diagram of estimated slip angle and slip velocity. An electronic stability controller (ESC) may be used to calculate percentage slip. The percentage slip may represent a difference between how fast the wheel is rolling and how fast the vehicle is moving. In order for a tire to generate forces, the tire has to turn slower or faster than it is rolling.

Figure 3:
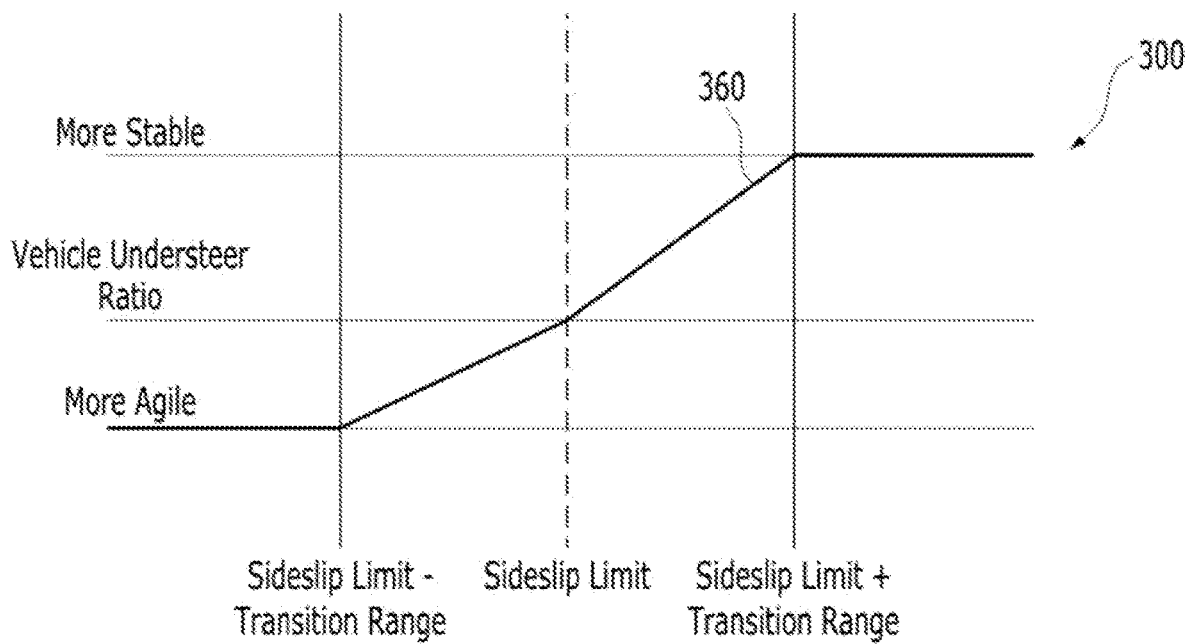
FIG. 3 illustrates the stability indicator interpolation in accordance with embodiments described herein.

The stability indicator 110 outputs the sideslip estimate 115 to a desired performance block 120. The desired performance block 120 may use a linear transition based on the measured sideslip 115 to choose between three set points (including more stable, no change, more agile), though embodiments are not limited thereto. Alternative approaches could include more or less set points as well as a nonlinear transition between the points. A plot of the linear interpolation is illustrated in FIG. 3. The desired performance block 120 may use a look-up table or a given formula based on the stability indicator to determine the set points.

The set points may refer to a target vehicle performance based on the stability state of the vehicle. The target performance is the output of the desired performance block and may be represented as target understeer. This value represents the understeer ratio which is based on an effective cornering stiffness at the front and rear axle of a vehicle as well as the location of the center of gravity. The vehicle understeer ratio is a value in which the built-in model reference without RWS produces the same yaw rate as the measured vehicle yaw rate with RWS off. The terms on-center and off-center understeer ratios may be used to represent alternative vehicle performance targets. These can be described as (a) on center understeer ratio that makes the vehicle yaw more (agility and maneuverability); and (b) off center understeer ratio that makes the vehicle yaw less (stability).

Figure 2:
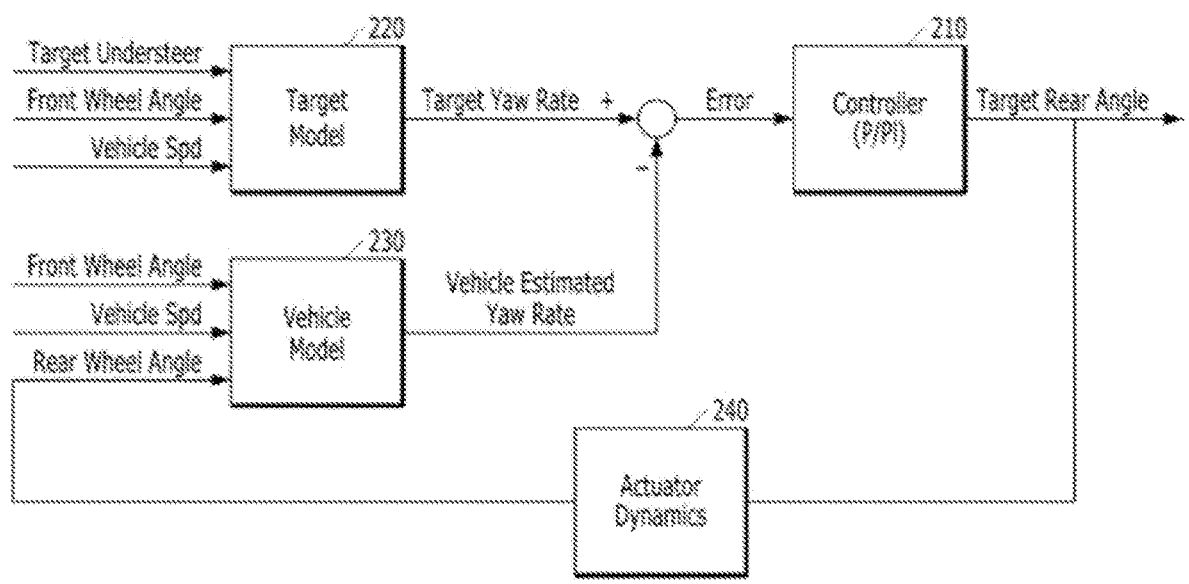
FIG. 2 illustrates components of the high speed loop in accordance with FIG. 1.

The target understeer is input to a high speed loop 130. The high speed loop 130 is logic used when the vehicle is travelling at high vehicle speeds. As illustrated in FIG. 2, the high speed loop 130 uses a target understeer model 220 and a vehicle model 230 to determine the rear wheel angle to be used by the vehicle in the high speed range. The determined rear wheel angle is fed to the actuator dynamics 240 and used to adjust the rear wheels to the determined angle.

FIG. 2 illustrates components of the high speed loop 130 in accordance with FIG. 1. As illustrated in FIG. 2, the high speed loop 130 includes a controller 210. The core logic for the high speed loop 130 is a paired model approach. The high speed loop 130 incudes a target understeer model 220 having varying parameters and a vehicle model 230 having fixed parameters representing a current state of the vehicle. Aspects of these models are compared using yaw rate and their difference is used to generate a target rear angle by the controller 210. Although illustrated as separate vehicle models external to a controller 210, the target understeer model 220 and vehicle model 230 and subtractor 240 may be part of the controller 210. By using two models, one to represent the physical system and one to represent the target, the system 100 is able to produce a robust controller with a simplified design. This two-model approach may have many applications outside of the scope of rear wheel steering.

The controller 210 may use a proportional (P), proportional-integral (PI), proportional-integral-derivative (PID), or other controller. Other strategies such as robust control or model inversion could be used.

Control systems include a signal and target. As illustrated in FIG. 2, one aspect of embodiments described herein includes measuring the yaw rate of the vehicle and comparing the measured yaw rate to a target yaw rate. Based on the difference between the two, feedback or feed forward may be used to adjust the vehicle model and update the system 100.

In present embodiments, instead of using only a signal that is being measured, the system 100 measures other signals and uses those signals to parameterize the target understeer model 220. The vehicle model 230 is tracked based on the rear wheel angle of the vehicle. Performing control in this manner adds a simplified level of robust control by eliminating sensor noise in the difference taken between the two model vehicles and type of external disturbances. Using only two models, the system may work under a large array of inputs and is less sensitive to small disturbances and changes in those inputs. The target model 220 is being parameterized from measured values instead of taking direct values and doing a comparison.

After the controller 210 calculates what it wants the vehicle to do, the high speed loop 130 determines how to execute the change, which is the target rear wheel angle. Implementations for the controller 210 could take many forms. As discussed herein, in one example a proportion-integral (PI) loop could be used. The target understeer model 220 represents the desired state of the vehicle. The vehicle model 230 represents the current state of the vehicle. A changing understeer ratio may allow the performance target to continually change. As illustrated in FIG. 2, using the vehicle speed and the front wheel angle, the vehicle model 230 can simulate how the vehicle is working and the controller 210 can compare the vehicle model 230 and the target understeer model 220, and look at the difference in a particular value, which is the difference in the yaw rate.

The target understeer model 220, using several factors including the target understeer, may compute a target yaw rate, for example. The vehicle model 230, using several factors including the rear wheel angle, may calculate a vehicle estimated yaw rate. The controller 210 computes a difference between the target yaw rate and the estimated yaw rate as an error value to calculate a target rear wheel angle of the vehicle. This target rear wheel angle is converted to an actual angle by vehicle actuator dynamics 240, and a new rear wheel angle is input into the vehicle model 230. The system takes a difference between the vehicles estimated performance, the vehicle model 230, and the vehicles desired performance, the target understeer model 220.

FIG. 3 illustrates stability indicator interpolation 300 in accordance with embodiments described herein. In the graph, target understeer settings range from more agile to more stable. The function sets a tunable sideslip limit to determine which of the understeer ratios will be fed to the model reference in the high sped loop 130. If the sideslip is "low," the reference is fed an on-center understeer ratio prioritizing "agility." If the sideslip is "high," the reference is fed an off-center understeer ratio prioritizing "stability." Within the transition range, the ratio is linearly interpolated between the two to smooth the transition.

FIG. 3 illustrates a graph plotting agility versus stability. Coordinates on the x-axis may indicate stability determinants. In this case sideslip may be used but embodiments are not limited thereto. Other variables to measure stability could be lateral acceleration, yaw rate, sideslip velocity, and others.

Though the plot 360 is illustrated as straight lines, in other embodiments the ramping up or down of agility or stability may not be linear. Based on the sideslip limit and transition range, the system may ramp up stability quickly in the beginning, or the rise may be more gradual.

The plot 360 represents a starting point and an end point. The starting point, midpoint, and endpoint on the plot 360 may be different. The graph 360 between the first point and third point may be variable. The response to the target understeer may fluctuate between agility and stability. The overall slope may be reversed. The system may flow from stable to agile. The algorithm of the controller 210 makes the vehicle more or less agile. There is fixed duration for promoting stability or agility. Agility could be promoted for a long time, and then ramp into stability quickly. Embodiments include a controller that promotes agility or stability based a variety of factors including speed, lateral acceleration, front wheel angle, and other factors.

The x-axis stability determination is measured. In this case there is denoted "Sideslip Limit-Transition Range,"

"Sideslip Limit," and "Sideslip Limit+Transition Range." However, embodiments are not limited to three values. These may be set by a vehicle designer. How a vehicle is directed to move across these points is determined by embodiment described herein, regarding how a vehicle is adjusted for stability or agility within these limits. The algorithm described herein acts on a vehicle when in motion. The transition ranges can be very narrow, or very wide, depending on how a designer sets them.

Embodiments provide that the system when in motion can change from stability to agility fast or slow. The slopes of the graph 360 may be more or less aggressive one way or another. The shape does exist with the logic. As the algorithm cycles, a vehicle will shift from agility targets to stability targets depending on the action of a driver.

Figure 4:
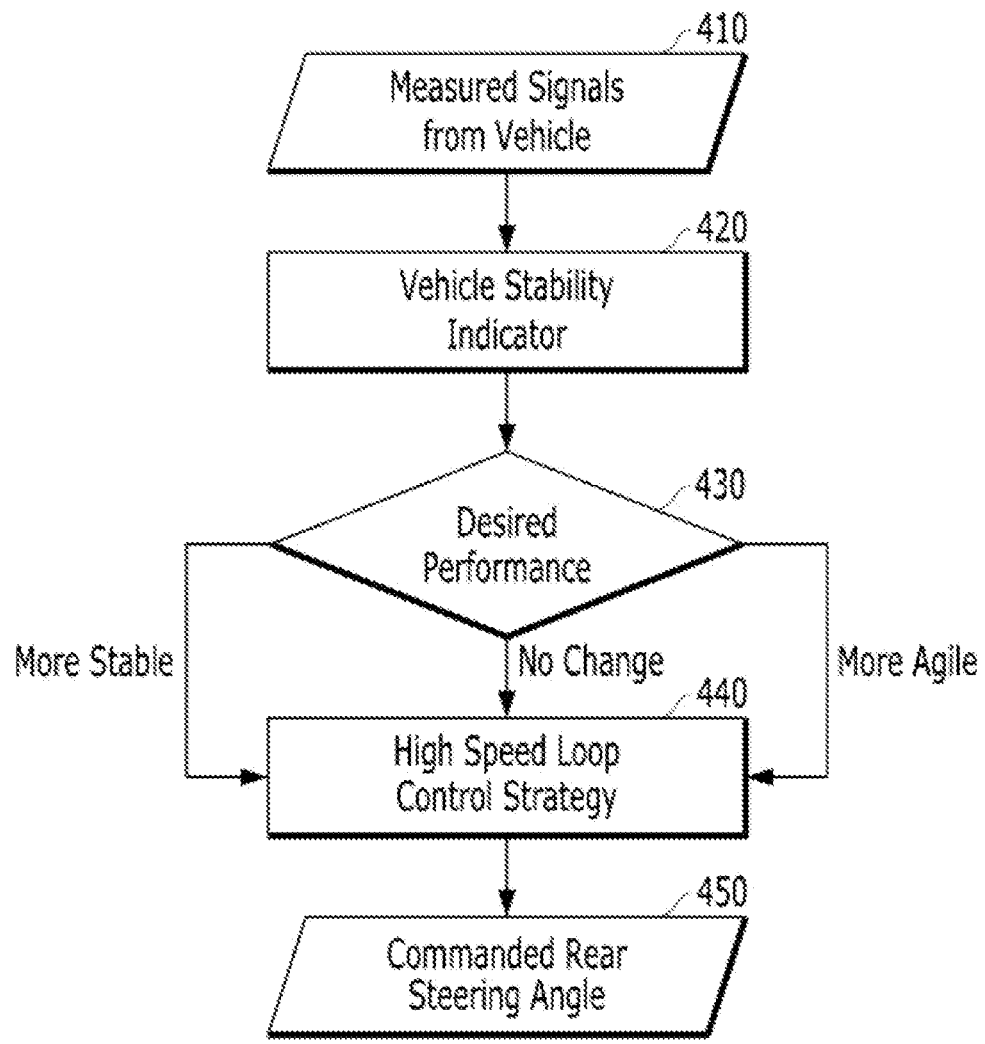
FIG. 4 illustrates a flow diagram in accordance with FIG. 1.

FIG. 4 illustrates a method of determining a target rear angle in accordance with embodiments described herein. In an operation 410, the system 100 may measure signals from vehicle sensors. The system 100 constantly determines what the vehicle is doing, whether the vehicle is turning or driving straight. While the vehicle is driving in a substantially straight manner, system 100 may direct the vehicle to be very agile with minimum stability. The vehicle may be enabled for speed. There may be numerous other inputs monitored by a vehicle such as roll rate, pitch, independent wheel speeds, and others.

In a high angled corner turn, the system 100 may be programmed not to compensate for agility, but rather to promote stability. Agility may be analogous to oversteer, stability to understeer. These determinations are based on values being measured, the state of the automobile.

As noted, the state of the vehicle may be determined by sensor inputs such as yaw rate, lateral acceleration, vehicle speed, and others. A stability measurement may be determined at operation 420 by the stability indicator 110. An output state of the stability indicator operation 420 may be sideslip estimate to the desired performance block 120, but embodiments are not limited thereto. The output could be more complex such as a combination of sideslip and sideslip velocity.

Output of the desired performance operation 430 may be target understeer, or a value change in the parametrization. Target understeer is input to the target understeer model 220 which is compared to the vehicle model 230. The target understeer model 220 dictates how the target is changing. The target may refer to different parameters of a vehicle. In this case the target may be target understeer which may be set as more agile or less agile depending on the stability determination.

For example, when driving normally or substantially straight, sideslip may be very low in this system. The difference between where the vehicle is headed and where the vehicle is facing is very small. Straight or small turns do not produce much sideslip in the vehicle. The vehicle travels to a point to which it is steered. In such as case, values can be measured to determine that sideslip is low. When sideslip is low, the target understeer of a vehicle may be significantly more agile. In the operation 430, determining target understeer of a range between more agile, no change, and less agile (more stable) can be determined from a lookup table or a mathematical formula.

For example, the target understeer model 220 may be parameterized to be a very sporty vehicle when driving on center. Therefore the target understeer model may be parameterized to be a more aggressive model in terms of yaw rate, such that every time the steering wheel is turned, the target is going to be a more aggressive vehicle.

The target understeer may change based on what the vehicle is doing. The speed of the vehicle may be factor, whether on center or turning. As noted, when the vehicle is moving relatively straight, the controller 210 of the high speed loop 130 will continue to promote agility. As a driver starts moving away from substantially straight, the controller 210 is going to stop promoting the amount of agility. The measured difference between the vehicle model 230 and the target understeer model 220 will become closer.

For example as a driver begins a calm maneuver, the vehicle sensors communicated vehicle characteristics to the controller 130 that it wants to yaw more. As the driver starts performing more aggressive maneuvers, the target model 220 will change and the difference between the target understeer model 220 and vehicle model 230 is input to the controller 210 that is generating a target rear angle to decrease the yaw rate of the vehicle. Depending on a front wheel angle and other factors, the difference in yaw response from the vehicle could be relatively halfway between asserting stability and asserting agility.

In some embodiments, inputs may result in the controller 210 passing a middle ground point to a point where the vehicle state is becoming too aggressive, inching towards instability, or is becoming less aggressive one way or another. The controller 210 may determine that the vehicle is yawing too much. The target understeer output from the desired performance operation 430 becomes for the vehicle to yaw less. There is a constant back and forth directed by the controller 210 based on the changing target understeer.

For example, in an aggressive turn the vehicle may have a large yaw rate, risking the possibility of oversteer. To avoid it, the target understeer determined during the desired performance operation 430 will move toward being more stable, to communicate to the vehicle to yaw less. Embodiments herein describe controlling the steering (target understeer) to direct the vehicle to be more stable or more agile based on sensor inputs and the level of turning. The controller 210 described herein is designed to allow a given vehicle to understeer or oversteer more than it is capable of doing with a fixed rear axle.

Once the desired performance is obtained in operation 430, the high speed loop 130 may utilize the target understeer model 220 and the vehicle model 230 as implemented. The output of the controller 210, the commanded rear steering angle obtained during operation 450 is based on the difference between the two models 220 and 230. The parameterization of the system may be constantly changing. Desired performance 430 is one factor of the changing parameterization.

Alternative implementations may also include aspects such as a low speed loop. However, once a vehicle is going slow enough, there is little desire to promote stability in a sharp turn. There is little threat of understeer or oversteer at low speeds. When an automobile is in a low vehicle speed state, wheels are typically out of phase to promote agility, as there is little threat of understeer or oversteer.

Because embodiments of the inventive concepts are designed for high speed operation, some general speed guidelines may apply. Below roughly 22 mph may be considered low speed, and standard systems based on phase angle may be used. Between roughly 22 mph to 35 mph may be considered medium speed, which may use a mix between the phase system and newer systems and may be interpolated linearly or non-linearly. Above roughly 35 mph, the inventive concepts described herein may be used exclusively. At low speeds stability is usually not compromised. Embodiments described herein have benefits as speed increases.

As described herein, embodiments include an algorithm that vacillates between promoting agility or promoting stability depending on the stability determination at a given moment. Embodiments describe what the controller is doing to help a driver control the vehicle.

Some of the advantages that may be achieved by exemplary implementations and embodiments of the invention and/or exemplary methods of the invention include an ability to dynamically control the stability of a vehicle and assist a driver in various aspects of turning.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A computer-implemented method of controlling rear wheel steering in a vehicle, comprising:
   determining a stability state of the vehicle from a plurality of vehicle sensor inputs, the plurality of vehicle sensor inputs including each of yaw rate, vehicle speed, and lateral acceleration;
   determining a target vehicle performance based on the stability state of the vehicle;
   determining a target rear angle of rear vehicle wheels based on a difference between a target vehicle characteristic and a model vehicle characteristic; and
   controlling the rear wheel steering in the vehicle based on determined target rear angle of the rear vehicle wheels,
   wherein the target vehicle performance promotes agility and stability to a target model at different times based on the stability state of the vehicle,
   wherein an indicator of the stability state is sideslip, and
   wherein the rear wheel steering system of the vehicle is controlled such that when yaw rate of the vehicle is detected to be less than a predetermined value, the vehicle is optimized for speed, and when the yaw rate of the vehicle is detected to be greater than or equal to predetermined value, the vehicle is optimized for agility.

2. The method of claim 1, wherein the target vehicle performance is understeer.

3. The method of claim 1, wherein the target vehicle performance is oversteer.

4. The method of claim 1, wherein the target vehicle performance includes on center and off center understeer ratios represent alternative vehicle performance targets.

5. The method of claim 1, wherein the target vehicle performance is tunable.

6. The method of claim 1, wherein the determining a target rear angle includes comparing a target vehicle characteristic and an estimated vehicle characteristic.

7. A rear wheel steering system, comprising:
   a stability indicator configured to receive a plurality of vehicle inputs and output a stability state of the vehicle, wherein the plurality of vehicle inputs include each of yaw rate, vehicle speed, and lateral acceleration;
   a desired performance indicator configured to receive the stability state and output a target value into a target understeer model;
   a target understeer model configured to receive the target value and a plurality of vehicle characteristics and output a target vehicle behavior;
   a vehicle model to input a rear wheel angle and the plurality of vehicle characteristics and output an estimated vehicle behavior;
   a control unit configured to determine a difference between the target vehicle behavior and estimated vehicle behavior and use the difference to determine a target rear angle of rear wheels; and
   actuator dynamics configured to alter the rear wheel angle and output an updated rear wheel angle value to the vehicle model,
   wherein an indicator of the stability state is sideslip, and
   wherein the rear wheel steering system of the vehicle is controlled such that when yaw rate of the vehicle is detected to be less than a predetermined value, the vehicle is optimized for speed, and when the yaw rate of the vehicle is detected to be greater than or equal to predetermined value, the vehicle is optimized for agility.

8. The rear wheel steering system of claim 7, wherein the target value is target understeer.

9. The rear wheel steering system of claim 8, wherein target understeer prompts the target model to be more agile or less agile based on the stability state.

10. The rear wheel steering system of claim 7, wherein the plurality of vehicle inputs are measured using vehicle sensors.

11. The rear wheel steering system of claim 7, wherein the plurality of vehicle characteristics include front wheel angle and vehicle speed.

* * * * *